United States Patent
Jang et al.

(10) Patent No.: US 12,098,870 B2
(45) Date of Patent: Sep. 24, 2024

(54) GAS HEAT-PUMP SYSTEM AND METHOD OF CONTROLLING SAME

(71) Applicant: LG ELECTRONICS INC., Seoul (KR)

(72) Inventors: Heejoong Jang, Seoul (KR); Jinwoo Lee, Seoul (KR); Hojong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 17/136,201

(22) Filed: Dec. 29, 2020

(65) Prior Publication Data

US 2021/0199355 A1 Jul. 1, 2021

(30) Foreign Application Priority Data

Dec. 30, 2019 (KR) .................. 10-2019-0178153

(51) Int. Cl.
*F25B 30/02* (2006.01)
*F25B 27/02* (2006.01)
*F25B 41/20* (2021.01)
*F25B 41/31* (2021.01)
*F25B 49/02* (2006.01)

(52) U.S. Cl.
CPC ............. *F25B 30/02* (2013.01); *F25B 27/02* (2013.01); *F25B 41/20* (2021.01); *F25B 41/31* (2021.01); *F25B 49/02* (2013.01); *F25B 2327/00* (2013.01); *F25B 2400/04* (2013.01); *F25B 2600/2515* (2013.01); *F25B 2700/21* (2013.01)

(58) Field of Classification Search
CPC ................................ F25B 30/02; F25B 17/02
See application file for complete search history.

(56) References Cited

U.S. PATENT DOCUMENTS

| | | | |
|---|---|---|---|
| 2019/0011152 A1* | 1/2019 | Kniffler | F25B 30/02 |
| 2020/0277888 A1* | 9/2020 | Lee | F01P 7/16 |
| 2021/0053412 A1* | 2/2021 | Kim | B60L 58/27 |
| 2021/0190393 A1* | 6/2021 | Lee | F01P 5/02 |

FOREIGN PATENT DOCUMENTS

| | | | | |
|---|---|---|---|---|
| DE | 102011087256 A1 * | 5/2013 | | F01N 13/16 |
| WO | WO-2014074430 A1 * | 5/2014 | | F01P 3/20 |

OTHER PUBLICATIONS

Buecker et al., Internal Combustion Engine with an Arrangement for Recirculating Exhaust Gas and Supplying Cooled Charge Air, May 29, 2013, Whole Document (Year: 2013).*

* cited by examiner

*Primary Examiner* — Larry L Furdge
*Assistant Examiner* — Keith Stanley Myers
(74) *Attorney, Agent, or Firm* — KED & Associates LLP

(57) ABSTRACT

Proposed is a gas heat-pump system including: a compressor discharging compressed refrigerant; an indoor heat exchanger causing heat exchange to occur between indoor air and the refrigerant; an outdoor heat exchanger condensing the refrigerant; a four-way valve switching a flow direction; an engine; a radiator cooling heated coolant; an exhaust gas heat exchanger causing the heat exchange to occur between the coolant passing through the radiator and exhaust gas from the engine; and a first three-way valve switching a flow direction of the coolant and controlling an amount of the flowing coolant in such a manner that the coolant passing through the radiator flows toward at least one of the exhaust gas heat exchanger and the engine.

15 Claims, 11 Drawing Sheets

GAS HEAT-PUMP SYSTEM AND METHOD
OF CONTROLLING SAME

CROSS REFERENCE TO RELATED
APPLICATION

The present application claims priority to Korean Patent Application No. 10-2019-0178153, filed Dec. 30, 2019, the entire contents of which is incorporated herein for all purposes by this reference.

BACKGROUND OF THE INVENTION

Field of the Invention

The present disclosure relates to a gas heat-pump system and a method of controlling the gas heat-pump system and, more particularly, to a gas heat-pump system and a method of controlling the gas heat-pump system, which are capable of stably controlling temperature of coolant cooling an engine.

Description of the Related Art

A heat-pump system is a system that is capable of performing a cooling or heating operation through a refrigeration cycle, and operates in cooperation with a hot water supply apparatus or a cooling and heating apparatus. That is, hot water is produced or air conditioning for cooling and heating is performed using a heat source that is obtained as a result of heat exchange occurring between refrigerant in the refrigeration cycle and a predetermined heat storage medium.

A configuration for the refrigeration cycle requires that a compressor compressing refrigerant, a condenser condensing the refrigerant compressed by the compressor, an expansion device decompressing the refrigerant condensed by the condenser, and an evaporator evaporating the decompressed refrigerant are included.

The heat-pump systems include a gas heat-pump system (GHP). High capacity compressors are required for industrial use or for air conditioning in large non-residential buildings. That is, the gas heat-pump system is used as a system that, instead of an electric motor, uses an electric motor to drive a compressor compressing a large amount of refrigerant into high-temperature, high-pressure gas.

FIG. 1 is a view schematically illustrating a gas heat-pump system according to the related art.

With reference to FIG. 1, in the gas heat-pump system, in a heating operation mode, with a four-way valve 2, refrigerant discharged from a compressor 1 circulates toward an indoor heat exchanger 4. Then, the refrigerant heats indoor air and absorbs heat from coolant in an auxiliary heat exchanger 6. Subsequently, only gaseous refrigerant, resulting from separation in a gas-liquid separator 5, circulates back toward the compressor 1. In a cooling operation mode, with the four-way valve, the refrigerant discharged from the compressor 1 circulates toward an outdoor heat exchanger 3 and is cooled there. Then, the refrigerant cools the indoor air in the indoor heat exchanger 4. Subsequently, only gaseous refrigerant, resulting from the separation in the gas-liquid separator 5, circulates back toward the compressor 1.

The gas heat-pump system includes coolant that circulates through an engine 7 providing a drive force to the compressor 1 and thus cools the engine 7. The coolant absorbs waste heat generated in the engine 7 and supplies the waste heat absorbed in the heating operation mode to the refrigerant passing through the auxiliary heat exchanger 6. In this manner, the coolant contributes to improving the performance of the gas heat-pump system.

In the gas heat-pump system in the cooling operation mode, the coolant cools the engine 7. Then, with a three-way valve 8, the coolant flows toward a radiator 9. Subsequently, the coolant cooled in the radiator 9 passes through an exhaust gas heat exchanger 11 and an exhaust manifold 12, circulates back toward the engine 7, and cools the engine 7.

At this point, high-temperature exhaust gas flows through the exhaust gas heat exchanger 11 and the exhaust manifold 12, and thus the coolant passing through the exhaust gas heat exchanger 11 and the exhaust manifold 12 absorbs heat. For this reason, the coolant is heated to a high temperature.

That is, an increase in the temperature of the coolant increases temperature of engine oil. Thus, a knocking phenomenon occurs frequently in the engine, thereby shortening the life of the engine 7 and reducing the performance thereof.

In addition, in the gas heat-pump system in the related art, the coolant always passes through the exhaust gas heat exchanger 11 and the exhaust manifold 12 before being supplied to the engine 7. For this reason, a size of the radiator 9 needs to be increased to decrease the temperature of the coolant to a predetermined level. However, increases in the size of the gas heat-pump system and in the manufacturing cost impose limitations on an area where the gas heat-pump system is installed.

The foregoing is intended merely to aid in the understanding of the background of the present disclosure, and is not intended to mean that the present disclosure falls within the purview of the related art that is already known to those skilled in the art.

SUMMARY OF THE INVENTION

An objective of the present disclosure is to provide a gas heat-pump system and a method of controlling the gas heat-pump system, which are capable of stably controlling temperature of coolant by additionally installing a flow path along which the coolant flows, without changing a size of a radiator.

According to an aspect of the present disclosure, there is provided a gas heat-pump system including: a compressor compressing refrigerant and discharging the compressed refrigerant; an indoor heat exchanger causing heat exchange to occur between indoor air and the refrigerant and thus cooling or heating an indoor space; an outdoor heat exchanger condensing the refrigerant; a four-way valve switching a flow direction of the refrigerant in such a manner that the refrigerant discharged from the compressor flows toward the outdoor heat exchanger in a cooling operation mode and flows toward the indoor heat exchanger in a heating operation mode; an engine providing a drive force to the compressor; a radiator cooling coolant that is heated while passing through the engine; an exhaust gas heat exchanger causing the heat exchange to occur between the coolant passing through the radiator and exhaust gas discharged from the engine; and a first three-way valve switching a flow direction of the coolant and controlling an amount of the flowing coolant in such a manner that the coolant passing through the radiator flows toward at least one of the exhaust gas heat exchanger and the engine.

The system may further include a main coolant line along which the coolant cooling the engine flows back to the engine after passing through the radiator and the exhaust gas heat exchanger; and a bypass coolant line branching off from the main coolant line between the radiator and the exhaust gas heat exchanger and being connected to the engine.

In the system, the first three-way valve may be provided at a point where the bypass coolant line branches off from the main coolant line, and closes the main coolant line or the bypass coolant line or controls the amount of the coolant flowing along the main coolant line and the bypass coolant line.

The system may further include an exhaust manifold collecting exhaust gas discharged from cylinders of the engine and supplying the collected exhaust gas to the exhaust gas heat exchanger.

In the system, the main coolant line may be connected such that the coolant flows toward the engine after passing through both the exhaust gas heat exchanger and the exhaust manifold.

The system may further include a temperature sensor measuring temperature of the coolant to be introduced into the engine.

In the system, in a manner that corresponds to the measured temperature of the coolant, the first three-way valve may close the main coolant line or the bypass coolant line, or may control the amount of the coolant flowing along the main coolant line and the bypass coolant line.

The system may further include: an auxiliary refrigerant line branching off from a main refrigerant line connecting the indoor heat exchanger and the outdoor heat exchanger to each other, passing through an auxiliary heat exchanger, and then being connected to the compressor; an auxiliary expansion valve opening and closing the auxiliary refrigerant line between the indoor heat exchanger and the auxiliary heat exchanger; an auxiliary coolant line branching off from the main coolant line connecting the engine and the radiator to each other, passing through the auxiliary heat exchanger, and then being connected to the first three-way valve; and a second three-way valve switching the flow direction of the coolant in such a manner that the coolant passing through the engine flows along the main coolant line or the auxiliary coolant line.

According to another aspect of the present disclosure, there is provided a method of controlling a gas heat-pump system, the system being configured in such a manner that, with a second three-way valve, coolant cooling an engine supplying a drive force to a compressor flows toward a radiator or an auxiliary heat exchanger, and that, with a first three-way valve, the coolant passing through the radiator or the auxiliary heat exchanger flows along a bypass coolant line along which the coolant is to circulate directly toward the engine or flows along a main coolant line along which the coolant is to circulate toward the engine after passing through an exhaust gas heat exchanger and an exhaust manifold.

The method of controlling the gas heat-pump system includes: determining which of a cooling operation mode and a heating operation mode is selected; controlling the second three-way valve in a manner that corresponds to the selected operation mode; and controlling the first three-way valve in a manner that corresponds to the selected operation mode.

In the method, when it is determined that the heating operation mode is selected in the determining of which of the cooling operation mode and the heating operation mode is selected, in the controlling of the second three-way valve, the second three-way valve may be controlled in such a manner that the coolant cooling the engine flows toward the auxiliary heat exchanger, and in the controlling of the first three-way valve, the first three-way valve may be controlled in such a manner that the coolant passing through the auxiliary heat exchanger flows along the main coolant line.

In the method, when it is determined that the cooling operation mode is selected in the determining of which of the cooling operation mode and the heating operation mode is selected, in the controlling of the second three-way valve, the second three-way valve may be controlled in such a manner that the coolant cooling the engine flows toward the radiator, and in the controlling of the first three-way valve, the first three-way valve may be controlled in such a manner that the coolant passing through the radiant flows along the bypass coolant line.

The method may further include determining whether or not a predetermined time has elapsed from when the engine is started.

In the method, when it is determined that the predetermined time has not elapsed from when the engine is started, in the determining of whether or not the predetermined time has elapsed from when the engine is started, in the controlling of the second three-way valve, the second three-way valve may be controlled in such a manner that the coolant cooling the engine flows toward the auxiliary heat exchanger, and in the controlling of the first three-way valve, the first three-way valve may be controlled in such a manner that the coolant passing through the auxiliary heat exchanger flows along the main coolant line.

The method may further include measuring temperature of the coolant to be introduced into the engine.

In the method, when it is determined that the heating operation mode is selected in the determining of which of the cooling operation mode and the heating operation mode is selected, in the controlling of the second three-way valve, the second three-way valve may be controlled in such a manner that the coolant cooling the engine flows toward the auxiliary heat exchanger, and, when it is determined that the cooling operation mode is selected, in the determining of which of the cooling operation mode and the heating operation mode is selected, in the controlling of the second three-way valve, the second three-way valve may be controlled in such a manner that the coolant cooling the engine flows toward the radiator, and in the controlling of the first three-way valve, the first three-way valve may be controlled in a manner that corresponds to the temperature of the coolant, which is measured in the measuring of the temperature of the coolant.

In the method, when the temperature of the coolant, which is measured in the measuring of the temperature of the coolant, falls below a lower end of a predetermined temperature range, in the controlling of the first three-way valve, the first three-way valve may be controlled in such a manner that the coolant flows along the main coolant line.

In the method, when the temperature of the coolant, which is measured in the measuring of the temperature of the coolant, falls within the predetermined temperature range, in the controlling of the first three-way valve, the first three-way valve may be controlled in such a manner that the coolant flows along the main coolant line and the bypass coolant line.

In the method, in the controlling of the first three-way valve, an amount of the coolant flowing along the main coolant line and the bypass coolant line may be controlled in such a manner that the measured temperature of the coolant falls within the predetermined temperature range.

In the method, when the temperature of the coolant, which is measured in the measuring of the temperature of the coolant, exceeds an upper end of the predetermined temperature range, in the controlling of the first three-way valve, the first three-way valve may be controlled in such a manner that the coolant flows along the bypass coolant line.

With the gas heat-pump system and the method of controlling the gas heat-pump system according to the present disclosure, a flow path along which the coolant flows is additionally installed and the flow direction of the coolant varies according to an operating condition. Thus, the advantage of stably controlling the temperature of the coolant can be achieved.

According to the present disclosure, the stable control of the temperature of the coolant makes it possible to stably drive the engine. Thus, the advantage of improving the engine can be achieved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
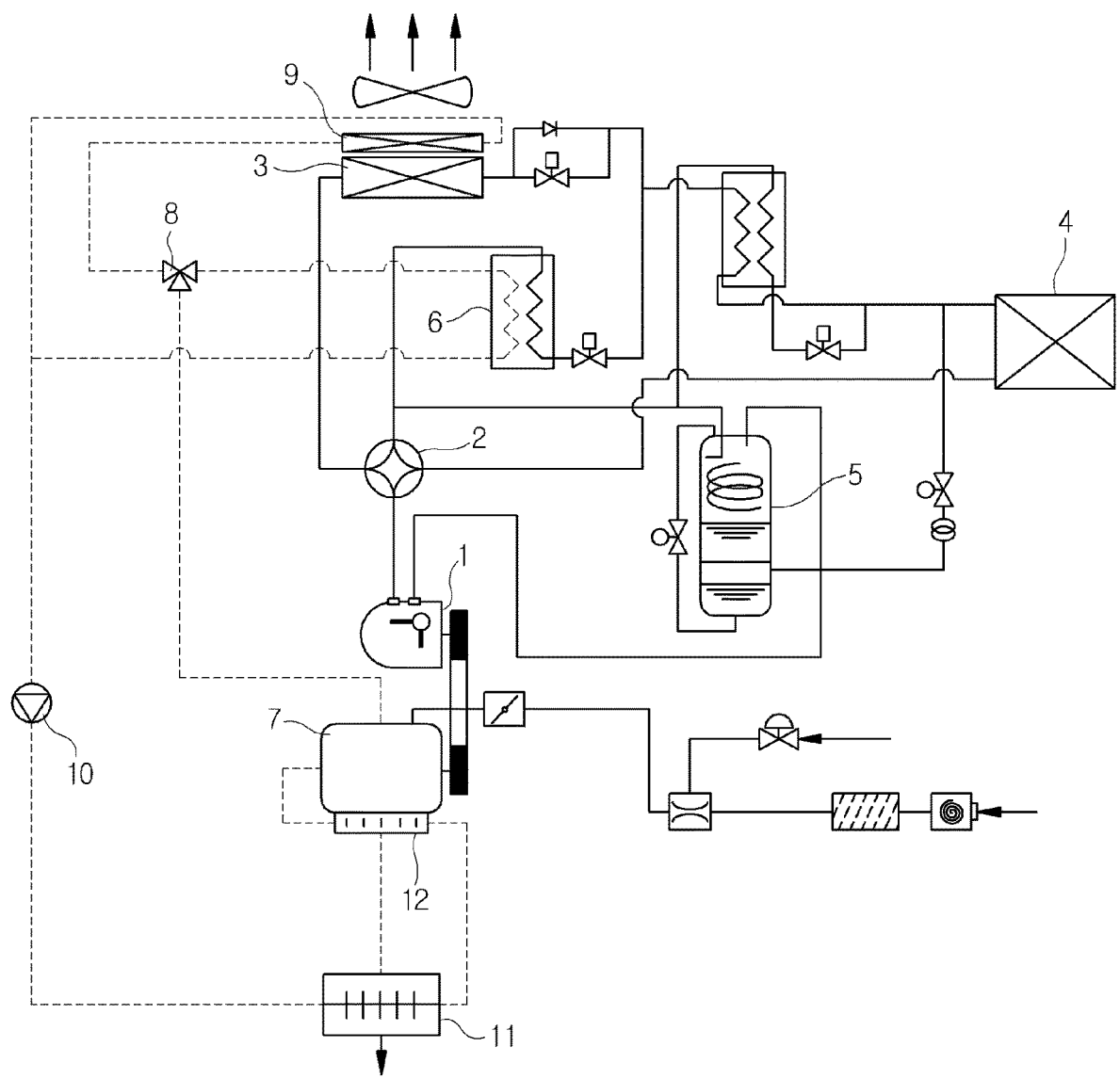
FIG. 1 is a view schematically illustrating a gas heat-pump system according to the related art.

A gas heat-pump system and a method of controlling the gas heat-pump system according to embodiments of the present disclosure will be described in more detail below to provide an understanding of features of the present disclosure.

It is noted that, if possible, the same constituent elements are given the same reference character throughout the accompanying drawings that are referred to for illustration and may be used as an aid in describing the embodiments. In addition, specific descriptions of well-known configurations and functions associated with the present disclosure will be omitted when determined as making the nature and gist of the present disclosure unclear.

Specific embodiments of the present disclosure will be described below with reference to the accompanying drawings.

Figure 2:
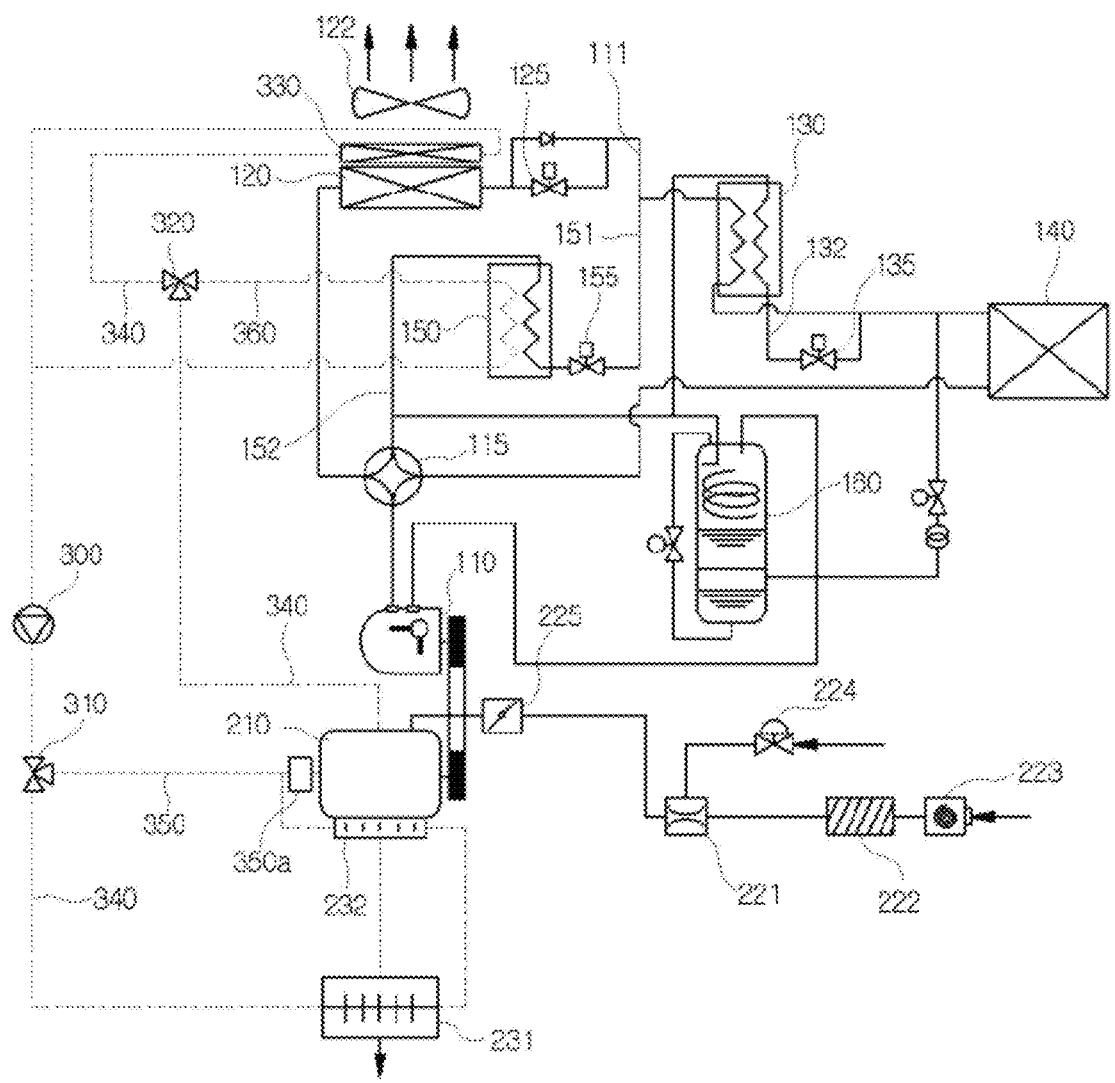
FIG. 2 is a view schematically illustrating a gas heat-pump system according to an embodiment of the present disclosure.
Figure 3:
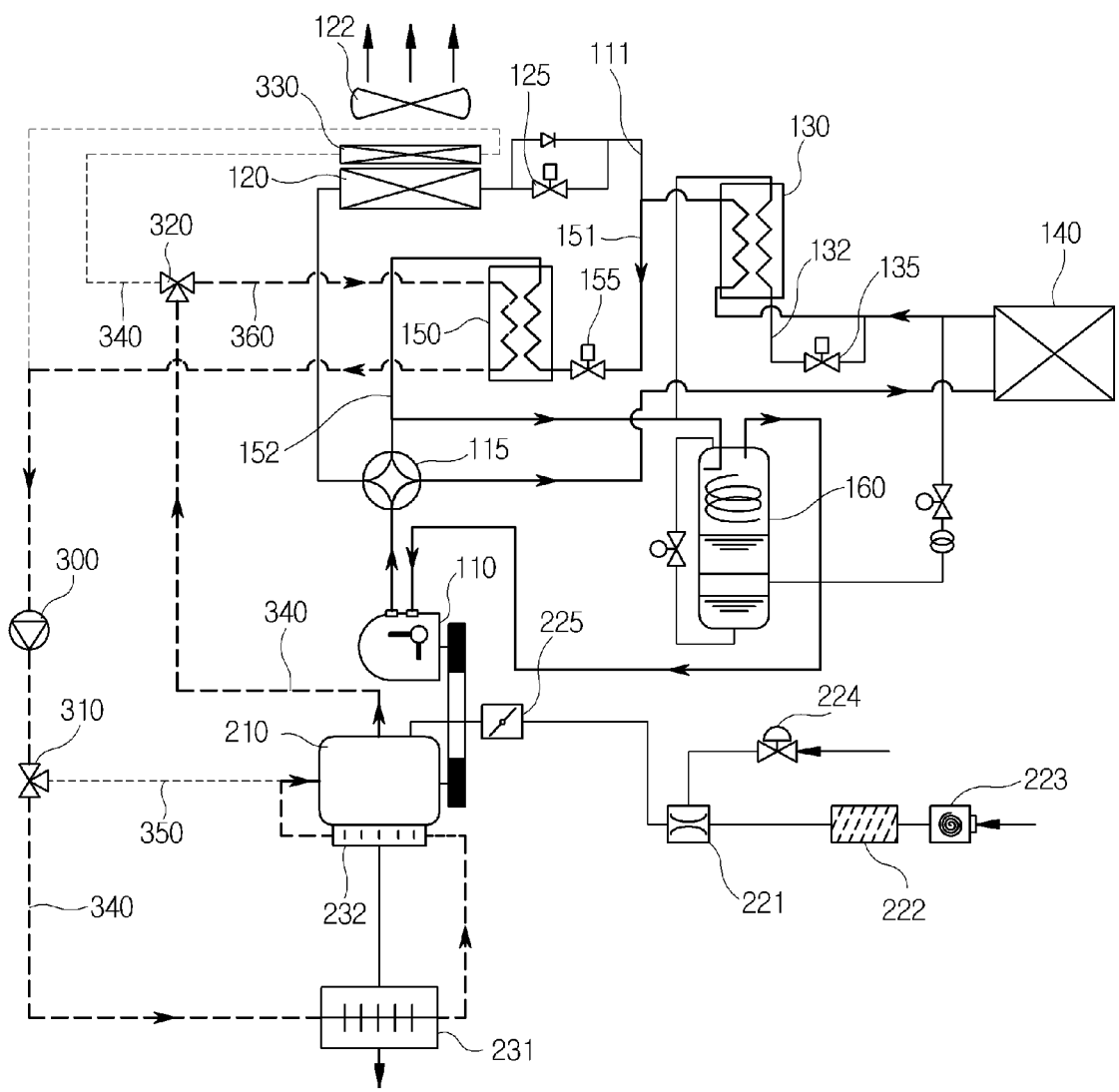
FIG. 3 is a view schematically illustrating the gas heat-pump system according to the embodiment of the present disclosure in a first heating operation mode.
Figure 4:
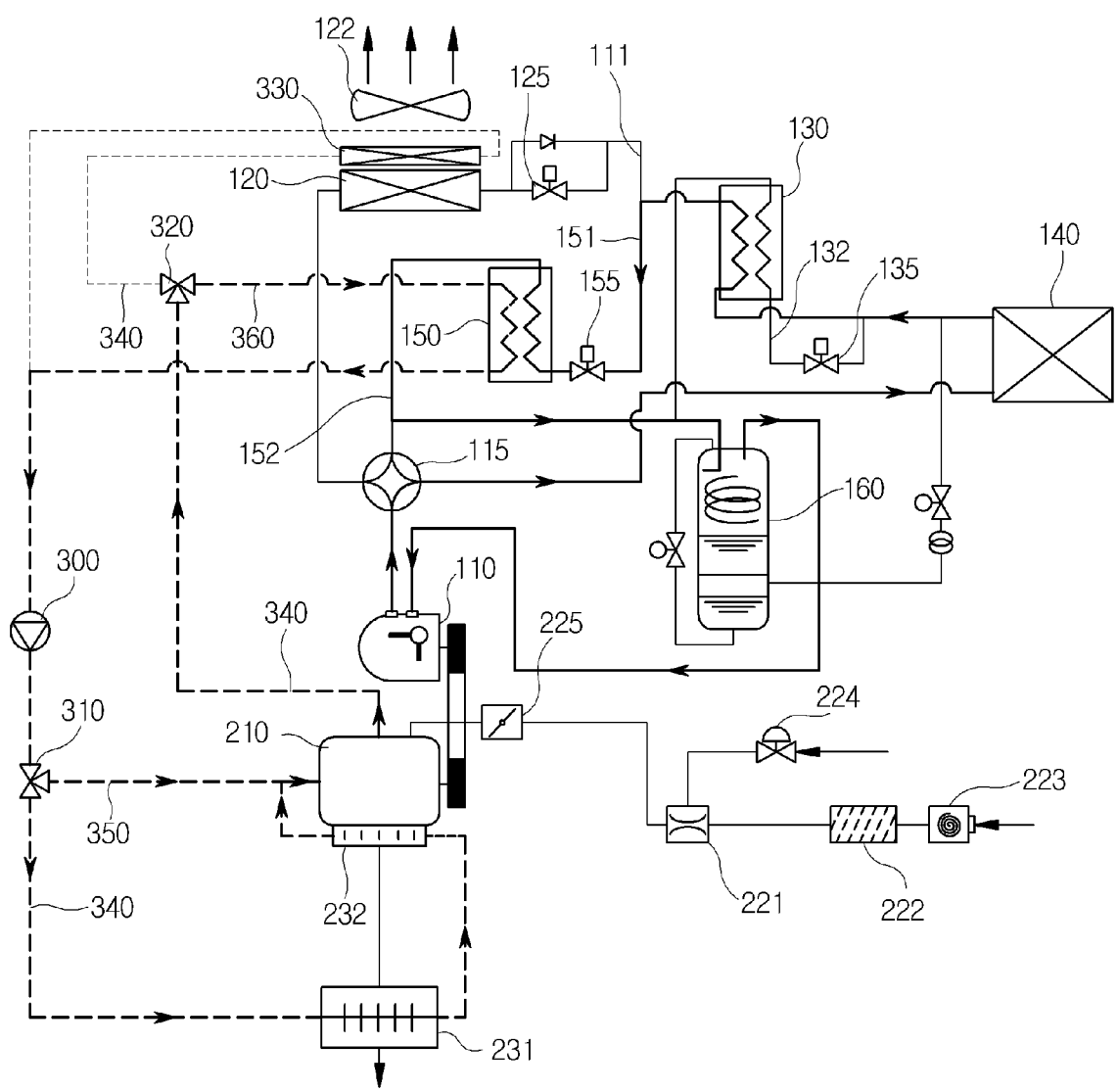
FIG. 4 is a view schematically illustrating the gas heat-pump system according to the embodiment of the present disclosure in a second heating operation mode.
Figure 5:
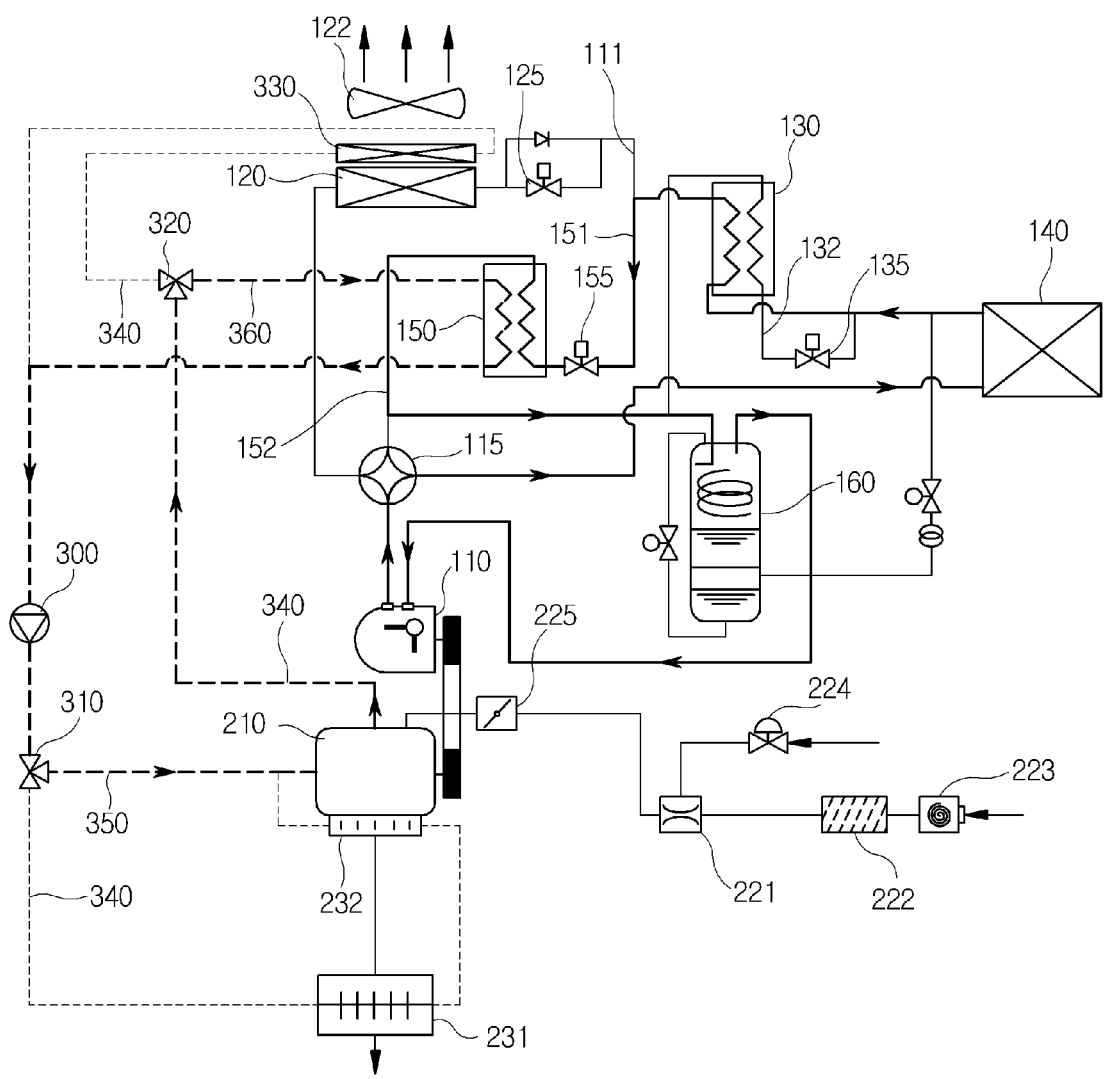
FIG. 5 is a view schematically illustrating the gas heat-pump system according to the embodiment of the present disclosure in a third heating operation mode.

FIG. 2 is a view schematically illustrating a gas heat-pump system according to an embodiment of the present disclosure. FIGS. 3 to 5 are views each schematically illustrating the gas heat-pump system in a heating operation mode. FIGS. 6 to 9 are views each schematically illustrating the gas heat-pump system in a cooling operation mode.

With reference to FIG. 2, the gas heat-pump system according to the embodiment of the present disclosure includes an air conditioning module, an engine module, and a coolant module.

The gas heat-pump system includes a plurality of components that constitute the air conditioning module for a refrigeration cycle.

The air conditioning module includes a plurality of components that are configured for cooling or heating an indoor space using the refrigeration cycle.

As an example, the air conditioning module includes a compressor 110, a four-way valve 115, an outdoor heat exchanger 120, an indoor heat exchanger 140, and a gas-liquid separator 160. The compressor 110 compresses refrigerant. The four-way valve 115 switches a flow direction of the refrigerant compressed in the compressor 110 in a manner that corresponds to the cooling operation mode and the heating operation mode. The outdoor heat exchanger 120 condenses the refrigerant. The indoor heat exchanger 140 causes heat exchange to occur between indoor air and the refrigerant and thus cools or heats the indoor space. The gas-liquid separator 160 separates liquid refrigerant and gaseous refrigerant from each other.

The outdoor heat exchanger 120 here is installed in an outdoor air conditioning condenser unit. An outdoor fan 122 is provided in the outdoor air conditioning condenser unit. The driving of the outdoor fan 122 causes the heat exchange to occur between outdoor air and the refrigerant passing through the outdoor heat exchanger 120, thereby cooling the refrigerant.

In the cooling operation mode, the air conditioning module with this configuration operates as follows. With the four-way valve 115, the refrigerant discharged in a compressed state from the compressor 110 is supplied to the outdoor heat exchanger 120. The refrigerant condensed in the outdoor heat exchanger 120 is supplied to the indoor heat exchanger 140, exchanges heat with the indoor air, and thus evaporates, thereby cooling the indoor air. Thereafter, the evaporating refrigerant passes through the four-way valve 115 and then is separated into the liquid refrigerant and the gaseous refrigerant by the gas-liquid separator 160. The resulting gaseous refrigerant is supplied to the compressor 110 and circulates.

A main expansion valve 125 for depressurizing the refrigerant is provided to the exit side of the outdoor heat exchanger 120. A depressurizing operation by the main expansion valve 125 further cools the refrigerant passing through the outdoor heat exchanger 120.

A supercooling heat exchanger 130, a supercooling flow path 132, and a supercooling expansion valve 135 are further provided to the exit side of the main expansion valve 125. The supercooling heat exchanger 130 additionally cools the refrigerant. The supercooling flow path 132 branches off from the main refrigerant line 111 connecting the outdoor heat exchanger 120 and the indoor heat exchanger 140 to each other, passes through the supercooling heat exchanger 130 and is connected to the gas-liquid separator 160. The supercooling expansion valve 135 is provided on the supercooling flow path 132 in such a manner as to be positioned to the entrance side of the supercooling heat exchanger 130 and depressurizes the refrigerant.

With this configuration, a depressurizing operation by the supercooling expansion valve 135 cools the refrigerant flowing out of the supercooling flow path 132. The cooled refrigerant is further cooled while passing through the main refrigerant line 111 in the supercooling heat exchanger 130 and then is discharged to the gas-liquid separator 160.

Furthermore, in the heating operation mode, the air conditioning module operates as follows. With the four-way valve 115, the refrigerant discharged in the compressed state from the compressor 110 is supplied to the indoor heat exchanger 140, exchanges heat with the indoor air, and is condensed, thereby heating the indoor air. Thereafter, the refrigerant exchanges heat with the coolant heated in an auxiliary heat exchanger 150 and evaporates. Thereafter, the refrigerant passes through the four-way valve 115 and then is separated into the liquid refrigerant and the gaseous refrigerant by the gas-liquid separator 160. The resulting gaseous refrigerant is supplied to the compressor 110 and circulates.

To this end, the air conditioning module may further include an auxiliary refrigerant line 151 and an auxiliary expansion valve 155. The auxiliary refrigerant line 151 branches off from the main refrigerant line 111 connecting the indoor heat exchanger 140 and the outdoor heat exchanger 120 to each other, passes through the auxiliary heat exchanger 150, and then is connected to the compressor 110. The auxiliary expansion valve 155 opens and closes the auxiliary refrigerant line 151 between the indoor heat exchanger 140 and the auxiliary heat exchanger 150. The auxiliary expansion valve 155 here may operate in such a manner as to depressurize the refrigerant introduced into the auxiliary heat exchanger 150.

The engine module includes a plurality of components that are configured to provide a drive force for compressing the refrigerant in the compressor 110.

As an example, the engine module includes an engine 210, a mixer 221, an air filter 222, a silencer 223, a zero governor 224, and a flow control unit 225. The engine 210 combusts mixed gas and thus generates a motive force. The mixer 221 is arranged to the entrance side of the engine 210 and supplies the mixed gas. The air filter 220 supplies purified air to the mixer 221. The silencer 223 reduces intake noise. The zero governor 224 supplies fuel at a predetermined pressure or lower. The flow control unit 225 is arranged between the engine 210 and the mixer 221 and controls an amount of the mixed gas to be supplied to the engine 210. The flow control unit 225 is provided as a valve that employs an electronic throttle control (ETC) scheme.

With this configuration, the amount of the mixed gas that results from the mixer 221 mixing the air supplied in a purified state by the air filter 222 and the fuel supplied at the predetermined pressure or lower by the zero governor 224 is controlled by the flow control unit 225, and then the resulting mixed gas is supplied to the engine 210, thereby generating the motive force in the engine 210.

The motive force that is generated in this manner in the engine 210 is provided as the drive force for operating the compressor 110. Of course, although not illustrated, a turbocharger (not illustrated) may be further provided for supplying compressed mixed gas to the engine 210.

The cooling module includes a plurality of components that are configured to supply coolant for cooling the engine 210.

As an example, the coolant module includes a radiator 330 and a main coolant line 340. The radiator 330 cools the coolant heated while passing through the engine 210. The main coolant line 340 connects the engine 210 and a radiator 330 to each other. The radiator 330 is installed in the outdoor air conditioning condenser unit, and the outdoor fan 122 is installed in the outdoor air conditioning condenser unit. With this arrangement, the driving of the outdoor fan 122 causes the heat exchange to occur between the outdoor air and the coolant passing through the radiator 330, thereby cooling the coolant.

The coolant module may further include a coolant pump 300 that is arranged on the main coolant line 340 and forces the coolant to flow into the engine 210.

The coolant module may further include an exhaust gas heat exchanger 231 and an exhaust manifold 232. The exhaust gas heat exchanger 231 is on the main coolant line 340 in such a manner as to be positioned to the exhaust outlet side of the engine 210 and causes the heat exchange to occur between the coolant flowing along the main coolant line 340 and exhaust gas discharged from the engine 210. The exhaust manifold 232 collects the exhaust gas discharged from cylinders of the engine 210 and supplies the collected exhaust gas to the exhaust gas heat exchanger 231.

The coolant module may further include a first three-way valve 310. The first three-way valve 310 controls a flow direction of the coolant and an amount of the flowing amount in such a manner that the coolant passing through the radiator 330 flows toward at least one of the exhaust gas heat exchanger 231 and the engine 210. In this case, the bypass coolant line 350 connecting the first three-way valve 310 and the engine 210 to each other is provided.

That is, the first three-way valve 310 switches a flow direction in such a manner that the coolant passing through the radiator 330 flows directly into the engine 210 along the bypass coolant line 350 or passes through the exhaust gas heat exchanger 231 and the exhaust manifold 232 then flows into the engine 210 along the main coolant line 340.

Alternatively, the first three-way valve 310 is opened in such a manner that the coolant passing through the radiator 330 flows along both the bypass coolant line 350 and the main coolant line 340. Furthermore, the first three-way valve 310 controls an amount of the coolant that flows along the bypass coolant line 350 and the main coolant line 340 and thus adjusts temperature of the coolant to be introduced into the engine 210.

That is, the coolant to be introduced into the engine 210 along the bypass coolant line 350 passes through the radiator 330 and thus has a relatively low temperature. The coolant passing through the exhaust gas heat exchanger 231 and the exhaust manifold 232 along the main coolant line 340 absorbs heat in the exhaust gas heat exchanger 231 and the exhaust manifold 232. As a result, the relatively high-temperature coolant is introduced into the engine 210.

Therefore, the first three-way valve 310 controls the amount of the coolant that flows along the bypass coolant line 350 and the main coolant line 340, and thus adjusts the temperature of the coolant to be introduced into the engine 210.

To this end, a temperature sensor 350a that measures the temperature of the coolant to be introduced into the engine 210 is further provided. Data on temperature of the coolant are received from the temperature sensor. The degree of opening to which the first three-way valve 310 is open is adjusted in such a manner that a target temperature of the coolant falls within a predetermined temperature range. Thus, the amount of the flowing coolant that flows along the bypass coolant line 350 and the main coolant line 340 is controlled.

As an example, in a case where the temperature of the coolant to be introduced into the engine 210 has to fall within a predetermined temperature range of 72 to 78° C., when the temperature of the coolant falls to approximately 72 to 73° C., the first three-way valve 310 operates to adjust the degree of opening in such a manner that a larger amount of the coolant flows along the main coolant line 340, thereby increasing the temperature of the coolant. Furthermore, when the temperature of the coolant rises to about 77-78° C., the first three-way valve 310 operates to adjust the degree of opening in such a manner that a larger amount of the coolant flows along the bypass coolant line 350, thereby decreasing the temperature of the coolant. That is, the first three-way valve 310 feeds back the temperature of the coolant in real time and adjusts the degree of opening.

Furthermore, the coolant module may further include an auxiliary coolant line 360 and a second three-way valve 320. The auxiliary coolant line 360 branches off from the main coolant line 340 connecting the engine 210 and the radiator 330 to each other, passes through the auxiliary heat exchanger 150, and then is connected to the main coolant line 340 positioned to the exit side of the radiator 330. The second three-way valve 320 is provided at a point where the auxiliary coolant line 360 branches off from the main coolant line 340.

The second three-way valve 320 switches the flow direction in such a manner that the coolant passing through the engine 210 flows along the main coolant line 340 or the auxiliary coolant line 360. That is, the second three-way valve 320 switches the flow direction in such a manner that the coolant passing through the engine 210 flows toward the radiator 330 or the auxiliary heat exchanger 150.

As an example, with reference to FIGS. 3 to 5, in the cooling operation mode, the second three-way valve 320 switches the flow direction in such a manner that the coolant passing through the engine 210 flows along the main coolant line 340, is cooled in the radiator 330, and then flows back to the engine 210. Furthermore, with reference to FIGS. 6 to 9, in the heating operation mode, the second three-way valve 320 switches the flow direction in such a manner that the coolant passing through the engine 210 flows along the auxiliary coolant line 360, heats refrigerant in the auxiliary heat exchanger 150, and then flows back to the engine 210.

With this configuration, the gas heat-pump system according to the embodiment of the present disclosure includes the first three-way valve 310 and the bypass coolant line 350, which are to be positioned on the main coolant line 340. When the temperature of the coolant to be introduced into the engine 210 falls below the lower end of the predetermined temperature range, which is a target temperature range, in order to increase the temperature of the coolant, the first three-way valve 310 switches the flow direction in such a manner that the coolant flows along the main coolant line 340. Furthermore, when the temperature of the coolant to be introduced into the engine 210 exceeds the upper end of the predetermined temperature range, which is the target temperature range, in order to decrease the temperature of the coolant, the first three-way valve 310 switches the flow direction in such a manner that the coolant flows along the bypass coolant line 350.

In addition, when the temperature of the coolant to be introduced into the engine 210 falls within the predetermined temperature range that is the target temperature range, the first three-way valve 310 is opened in such a manner that the coolant flows along both the bypass coolant line 350 and the main coolant line 340. Furthermore, in order for the temperature of the coolant to stay within the predetermined temperature range, the degree of opening to which the first three-way valve 310 is open is adjusted in such a manner as to control the amount of the coolant flowing along the bypass coolant line 350 and the main coolant line 340.

Therefore, the temperature of the coolant to be introduced into the engine 210 is stably controlled, thereby ensuring the stable driving of the engine 210. Thus, the advantage of improving the performance of the engine 210 can be achieved.

A method of controlling the gas heat-pump system according to the embodiment of the present disclosure will be described in detail below with reference to the accompanying drawings.

Figure 10:
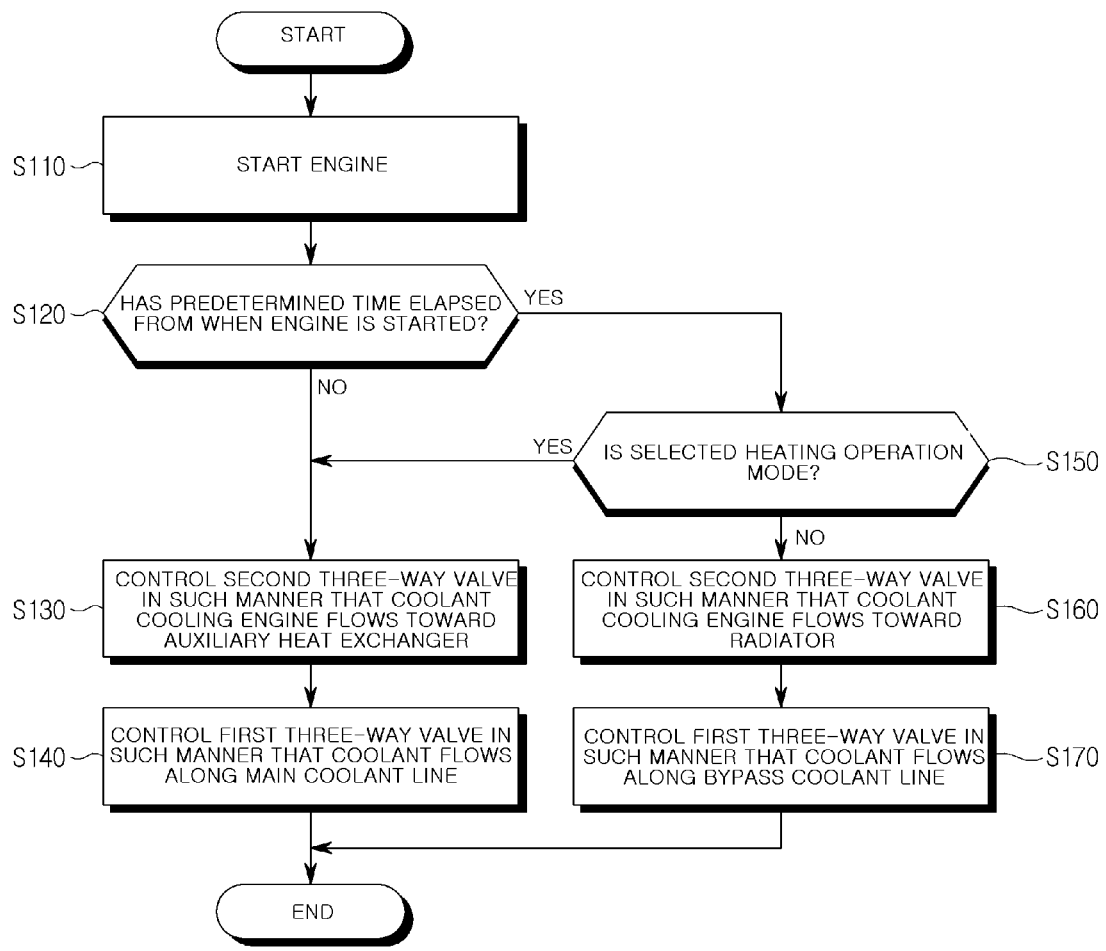
FIG. 10 is a flowchart schematically illustrating a method of controlling the gas heat-pump system according to a first embodiment of the present disclosure.
Figure 11:
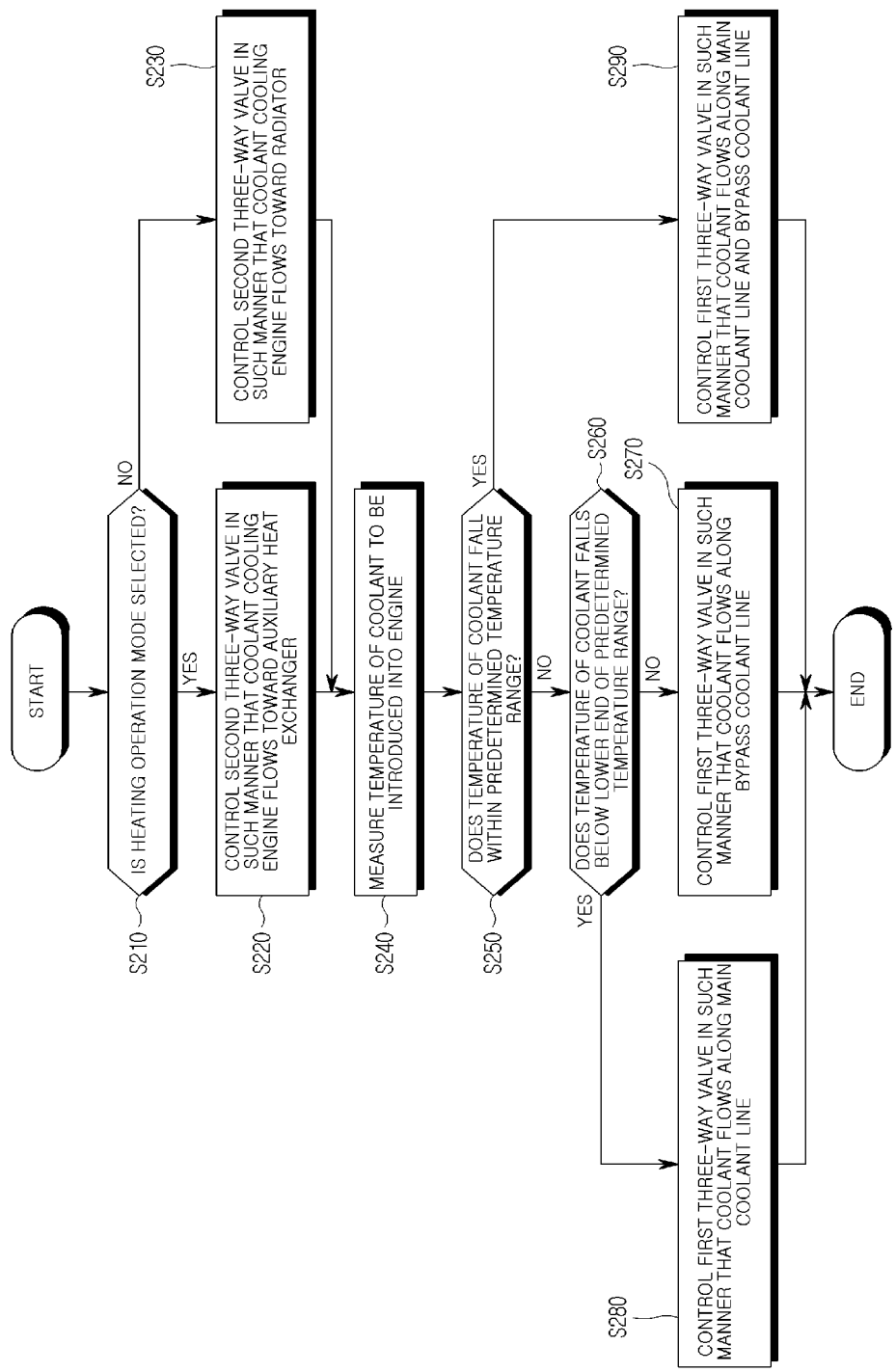
FIG. 11 is a flowchart schematically illustrating a method of controlling the gas heat-pump system according to a second embodiment of the present disclosure.

FIG. 10 is a flowchart schematically illustrating a method of controlling the gas heat-pump system according to a first embodiment of the present disclosure. FIG. 11 is a flowchart schematically illustrating a method of controlling the gas heat-pump system according to a second embodiment of the present disclosure.

In the method of controlling the gas heat-pump system according to the first embodiment of the present disclosure, it is determined whether or not a predetermined time has elapsed from when the engine 210 is started. In the method of controlling the gas heat-pump system according to the second embodiment of the present disclosure, after the predetermined time has elapsed from when the engine 210 is started, the temperature of the coolant to be introduced into the engine 210 is correspondingly controlled.

With reference to FIGS. 2 to 11, the method of controlling the gas heat-pump system includes an operation mode determination step of determining which of the cooling operation mode and the heating operation mode is selected, a second three-way valve control step of controlling the second three-way valve 320 in a manner that corresponds to the selected operation mode, and a first three-way valve control step of controlling the first three-way valve 310 in a manner that corresponds to the selected operation mode.

The method of controlling the gas heat-pump system may further include an engine driving determination step S120 of determining whether or not the predetermined time has elapsed from which the engine 210 is started (S110).

Figure 6:
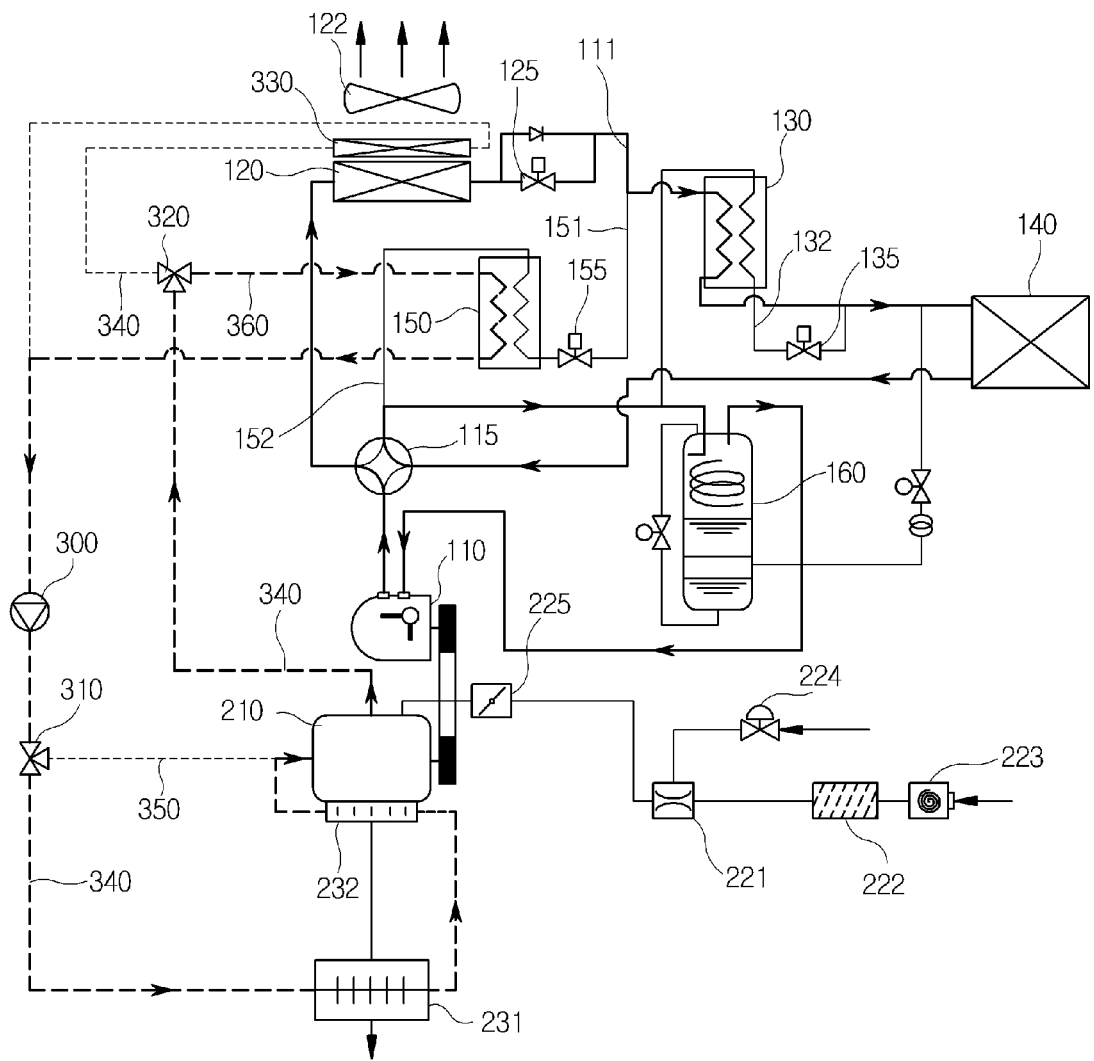
FIG. 6 is a view schematically illustrating the gas heat-pump system according to the embodiment of the present disclosure in a first cooling operation mode.

When reference to FIGS. 3, 6, and 10, when it is determined in the engine driving determination step S120 that the predetermined time has not elapsed from which the engine 210 is started (NO in S120), in the second three-way valve control step S130, the second three-way valve 320 is controlled in such a manner that the coolant cooling the engine 210 flows toward the auxiliary heat exchanger 150. Furthermore, in the first three-way valve control step S140, the first three-way valve 310 is controlled in such a manner that the coolant passing through the auxiliary heat exchanger 150 flows along the main coolant line 340.

That is, at an initial stage where the engine 210 is started, the coolant and engine oil have a low temperature. Thus, control is performed in such a manner that the temperature of the coolant rises quickly to the predetermined temperature range for a predetermined time after the predetermined time has elapsed from when the engine 210 is started.

To this end, in order for the coolant to absorb as much heat as possible at the initial stage where the engine 210 is started, control is performed in such a manner that, with the second three-way valve 320, the coolant discharged from the engine 210 circulates toward the auxiliary heat exchanger 150. The reason for this is that circulation of the coolant through the radiator 330 causes high heat loss, but that circulation of the coolant through the auxiliary heat exchanger 150 minimizes heat loss. In order for the coolant to absorb heat in the exhaust gas heat exchanger 231 and the exhaust manifold 232, the first three-way valve 310 is controlled in such a manner that the coolant passing through the auxiliary heat exchanger 150 flows along the main coolant line 340.

Accordingly, in order to minimize the heat loss and maximize the heat absorption at the stage where the engine 210 is started, the coolant is caused to circulate, thereby increasing the temperature of the coolant to the predetermined temperature range.

In a case where the predetermined time has not elapsed from when the engine 210 is started (NO in S120), in both the cooling operation mode and the heating operation mode, the control is performed in such a manner that the coolant circulates as described above. In a case where the predetermined time has elapsed from when the engine 210 is started (YES in S120) and the heating operation mode is selected (YES in S150), the control is performed in such a manner that the coolant circulates, as described above.

In a case where the predetermined time has elapsed from when the engine 210 is started (YES in S120) and the cooling operation mode is selected (NO in S150), in the second three-way valve control step S160, the second three-way valve 320 is controlled in such a manner that the coolant cooling the engine 210 flows toward the radiator 330. Furthermore, in the first three-way valve control step S170, the first three-way valve 310 is controlled in such a manner that the coolant passing through the radiator 330 flows along the bypass coolant line 350.

The method of controlling the gas heat-pump system may further include a coolant temperature measurement step S240 of measuring the temperature of the coolant to be introduced into the engine 210.

With reference to FIGS. 3 to 9 and 11, when it is determined in the operation mode determination step S210 that the heating operation mode is selected (YES in S210), in the second three-way valve control step S220, the second three-way valve 320 is controlled in such a manner that the coolant cooling the engine 210 flows toward the auxiliary heat exchanger 150. Furthermore, when it is determined that the cooling operation mode is selected (NO in S210), in the second three-way valve control step S230, the second three-way valve 320 is controlled in such a manner that the coolant cooling the engine 210 flows toward the radiator 330.

In the first three-way valve control step, the first three-way valve 310 is controlled in a manner that corresponds to the temperature of the coolant, which is measured in the coolant temperature measurement step S240.

More specifically, when it is determined that the temperature of the coolant, which is measured in the coolant temperature measurement step S240, falls below the lower end of the predetermined temperature range (YES in S260), in the first three-way valve control step S280, the first three-way valve 310 is controlled in such a manner that the coolant flows along the main coolant line 340.

When it is determined that the temperature of the coolant, which is measured in the coolant temperature measurement step S240, rises above the upper end of the predetermined temperature range (NO in S260), in the first three-way valve control step S270, the first three-way valve 310 is controlled in such a manner that the coolant flows along the bypass coolant line 350.

When it is determined that the temperature of the coolant, which is measured in the coolant temperature measurement step S240, falls within the predetermined temperature range (YES in S250), in the first three-way valve control step S290, the first three-way valve 310 is controlled in such a manner that the coolant flows along the main coolant line 340 and the bypass coolant line 350.

At this point, in the first three-way valve control step S290, the amount of the coolant flowing along the main coolant line 340 and the bypass coolant line 350 is controlled in such a manner that the measured temperature of the coolant falls within the predetermined temperature range.

Figure 7:
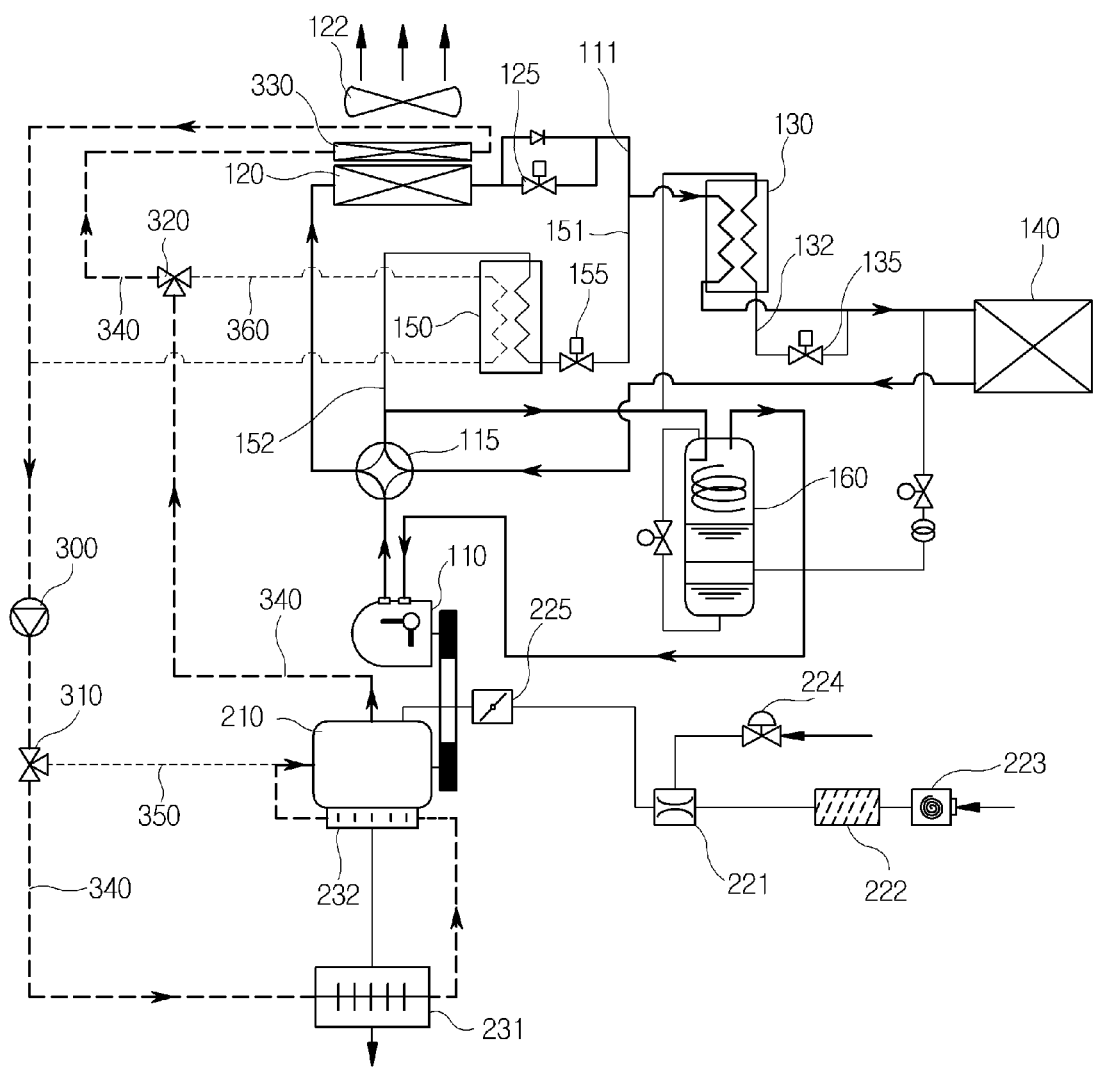
FIG. 7 is a view schematically illustrating the gas heat-pump system according to the embodiment of the present disclosure in a second cooling operation mode.

As an example, in a case where the temperature of the coolant to be introduced into the engine 210 is set to fall within a target temperature range of 72 to 78° C., when the measured temperature of the coolant to be introduced into the engine 210 falls below 72° C., the first three-way valve 310 is controlled in such a manner that the coolant flows along the main coolant line 340, as illustrated in FIGS. 3 and 7. Thus, the coolant absorbs heat in the exhaust gas heat exchanger 231 and the exhaust manifold 232, thereby increasing the temperature thereof.

Figure 9:
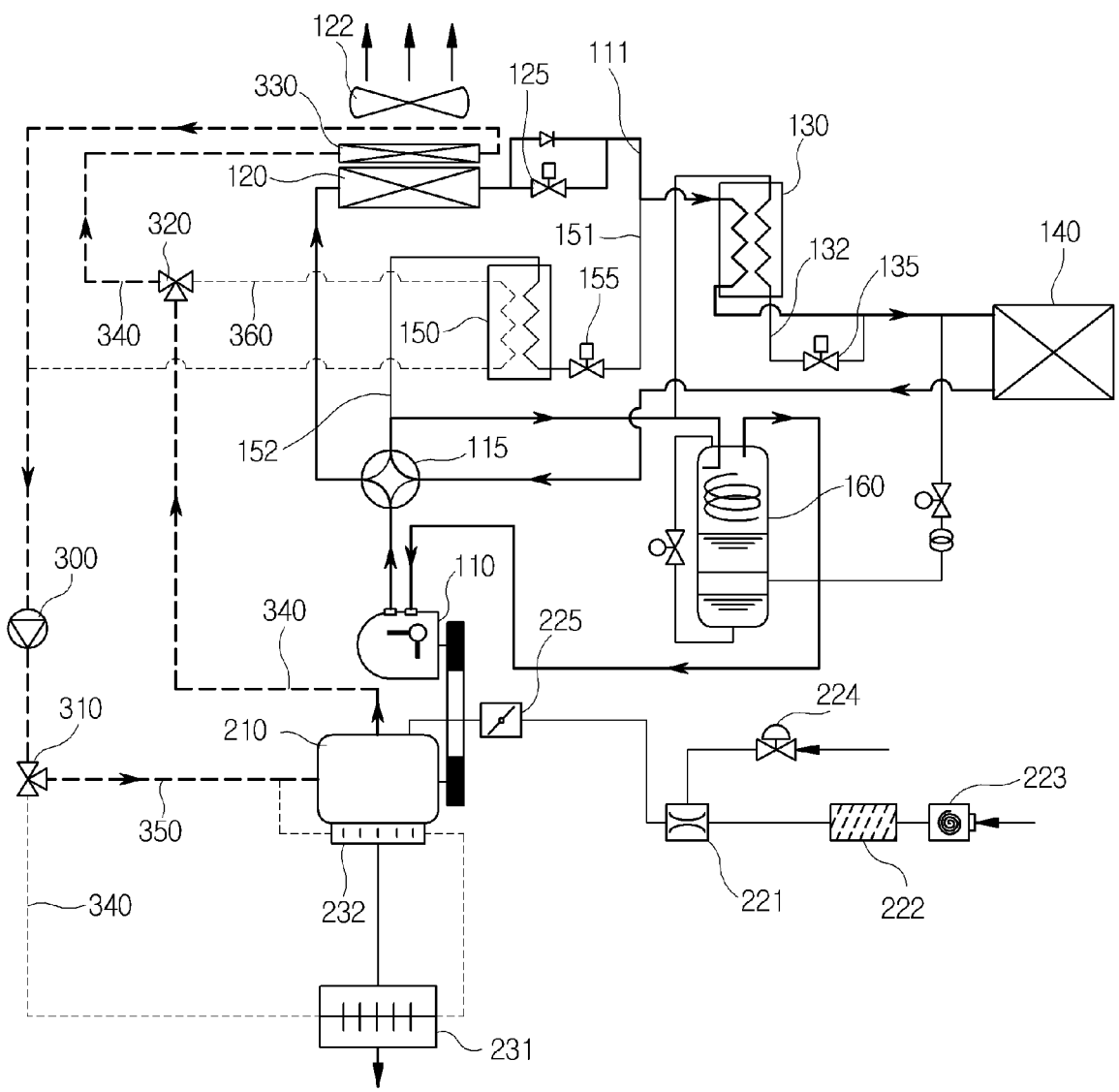
FIG. 9 is a view schematically illustrating the gas heat-pump system according to the embodiment of the present disclosure in a fourth cooling operation mode.

Conversely, when the measured temperature of the coolant to be introduced into the engine 210 rises above 78° C., the first three-way valve 310 is controlled in such a manner that the coolant flows along the bypass coolant line 350 to lower the temperature thereof, as illustrated in FIGS. 5 and 9. Thus, the coolant is introduced directly into the engine 210 without additionally absorbing heat.

Figure 8:
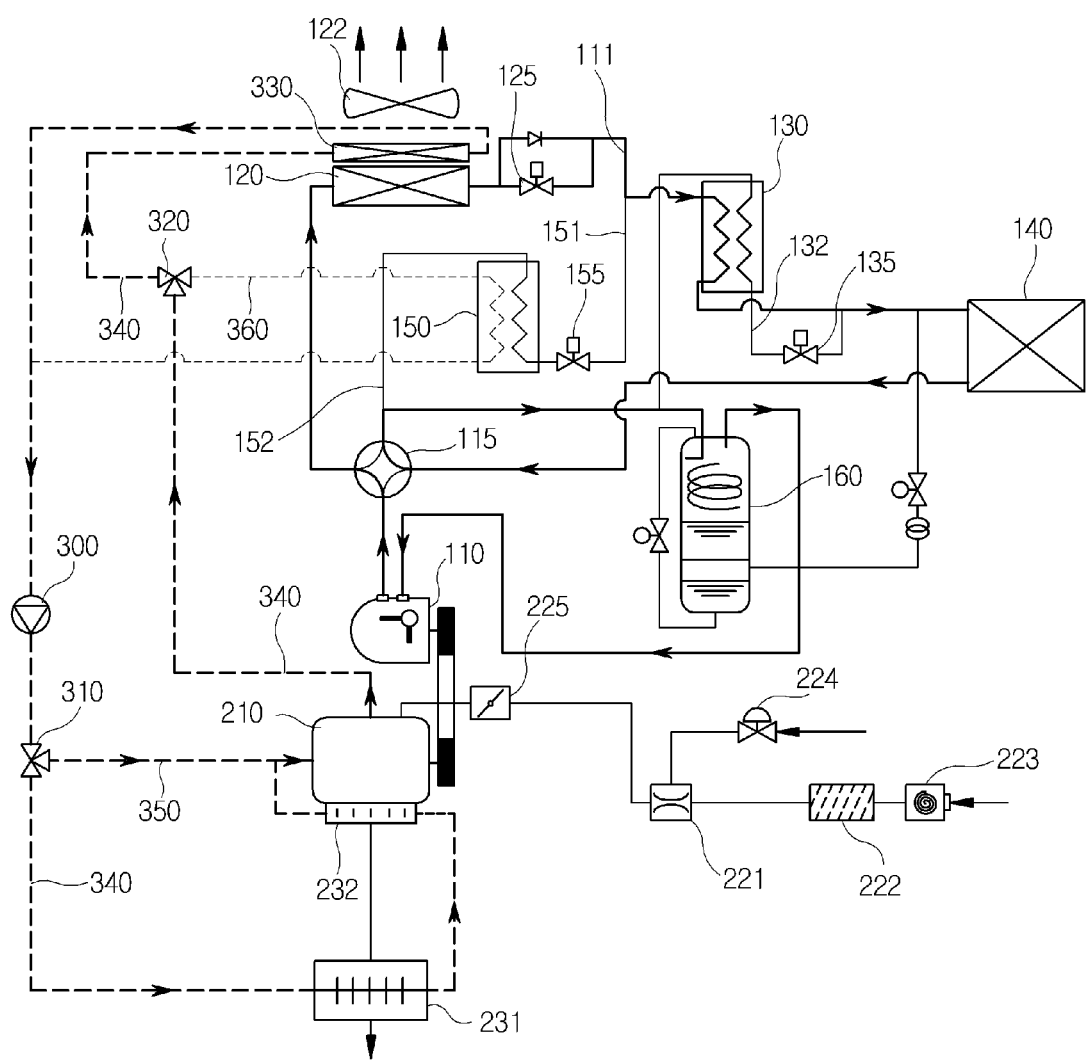
FIG. 8 is a view schematically illustrating the gas heat-pump system according to the embodiment of the present disclosure in a third cooling operation mode.

In a case where the temperature of the coolant to be introduced into the engine 210 falls within a temperature range of 72~78° C., the first three-way valve 310 is controlled in such a manner that the coolant flows along the bypass coolant line 350 and the main coolant line 340, as illustrated in FIGS. 4 and 8. At this point, when the temperature of the coolant falls to approximately 72 to 73° C., in order to increase the temperature of the coolant, the first three-way valve 310 operates to adjust the degree of opening in such a manner that a larger amount of the coolant flows along the main coolant line 340. Furthermore, when the temperature of the coolant rises to approximately 77~78° C., in order to decrease the temperature of the coolant, the first three-way valve 310 operates to adjust the degree of opening in such a manner that a larger amount of the coolant flows along bypass coolant line 350. That is, the first three-way valve 310 feeds back the temperature of the coolant in real time and adjusts the degree of opening.

Therefore, with the method of controlling the gas heat-pump system according to the embodiment of the present disclosure, the temperature of the coolant to be introduced into the engine 210 is stably controlled, thereby ensuring the stable driving of the engine 210. Thus, the advantage of improving the performance of the engine 210 can be achieved.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A gas heat-pump system, comprising:
   a compressor that compresses refrigerant and discharges compressed refrigerant;
   an indoor heat exchanger that performs heat exchange between indoor air and the refrigerant to cool or heat an indoor space;

an outdoor heat exchanger that condenses the refrigerant;
a four-way valve that switches a flow direction of the refrigerant in such a manner that the refrigerant discharged from the compressor flows toward the outdoor heat exchanger in a cooling operation mode and flows toward the indoor heat exchanger in a heating operation mode;
an engine that provides a drive force to the compressor;
a radiator that cools coolant which is heated while passing through the engine;
an exhaust gas heat exchanger that performs heat exchange between the coolant passing through the radiator and exhaust gas discharged from the engine; and
a first three-way valve through which the coolant flows from the radiator,
wherein the coolant flows from the radiator directly to the first three-way valve and the coolant flows from the first three-way valve to the engine, and
wherein the first three-way valve controls a flow direction and a flow rate of the coolant to flow the coolant to at least one of the exhaust gas heat exchanger or the engine while flowing the coolant to the engine.

2. The system of claim 1, further comprising:
a main coolant line along which the coolant cooling the engine flows back to the engine after passing through the radiator and the exhaust gas heat exchanger; and
a bypass coolant line that branches off from the main coolant line between the radiator and the exhaust gas heat exchanger and connects the first three-way valve to the engine.

3. The system of claim 2, wherein the first three-way valve is provided at a point where the bypass coolant line branches off from the main coolant line, and closes the main coolant line or the bypass coolant line or controls an amount of the coolant flowing along the main coolant line and the bypass coolant line.

4. The system of claim 2, further comprising:
an exhaust manifold that collects exhaust gas discharged from cylinders of the engine and supplies the collected exhaust gas to the exhaust gas heat exchanger, wherein the main coolant line is connected such that the coolant flows toward the engine after passing through both the exhaust gas heat exchanger and the exhaust manifold.

5. The system of claim 2, further comprising:
a temperature sensor that measures a temperature of the coolant to be introduced into the engine, wherein, in a manner that corresponds to the measured temperature of the coolant, the first three-way valve closes the main coolant line or the bypass coolant line, or controls an amount of the coolant flowing along the main coolant line and the bypass coolant line.

6. The system of claim 2, further comprising:
an auxiliary refrigerant line that branches off from a main refrigerant line that connects the indoor heat exchanger and the outdoor heat exchanger to each other, passing through an auxiliary heat exchanger, and then being connected to the compressor;
an auxiliary expansion valve that opens and closes the auxiliary refrigerant line between the indoor heat exchanger and the auxiliary heat exchanger;
an auxiliary coolant line that branches off from the main coolant line that connects the engine and the radiator to each other, passing through the auxiliary heat exchanger, and then being connected to the first three-way valve; and a second three-way valve that switches the flow direction of the coolant in such a manner that the coolant passing through the engine flows along the main coolant line or the auxiliary coolant line.

7. A gas heat-pump system, comprising:
a compressor that compresses refrigerant and discharges the compressed refrigerant;
an indoor heat exchanger that performs heat exchange between indoor air and the refrigerant to cool or heat an indoor space;
an outdoor heat exchanger that condenses the refrigerant;
a four-way valve that switches a flow direction of the refrigerant in such a manner that the refrigerant discharged from the compressor flows toward the outdoor heat exchanger in a cooling operation mode and flows toward the indoor heat exchanger in a heating operation mode;
an engine that provides a drive force to the compressor;
a radiator that cools coolant which is heated while passing through the engine;
an exhaust gas heat exchanger that performs heat exchange between the coolant passing through the radiator and exhaust gas discharged from the engine;
a first three-way valve through which the coolant flows from the radiator, and that flows the coolant into the engine;
a second three-way valve through which the coolant having passed through the engine flows, wherein the second three-way valve controls a flow of the coolant into the radiator or an auxiliary heat exchanger;
a main coolant line along which the coolant that cools the engine flows back to the engine after passing through the radiator and the exhaust gas heat exchanger; and
a bypass coolant line that branches off from the main coolant line between the radiator and the exhaust gas heat exchanger and connects the first three-way valve to the engine,
wherein the coolant flows from the radiator directly to the first three-way valve and the coolant flows from the first three-way valve to the engine, and
wherein the four-way valve is opened to allow refrigerant to flow to the outdoor heat exchanger in a cooling operation mode and is opened to allow the refrigerant to flow to the indoor heat exchanger in the heating operation mode.

8. The system of claim 7, wherein the second three-way valve is opened so that the coolant cooling the engine flows to the auxiliary heat exchanger in the heating operation mode, and the first three-way valve is opened so that the coolant passed through the auxiliary heat exchanger flows to the main coolant line in the heating operation mode.

9. The system of claim 7, wherein the second three-way valve is opened so that the coolant cooling the engine flows to the radiator in the cooling operation mode, and the first three-way valve is opened so that the coolant passed through the radiator flows through the bypass coolant line in the cooling operation mode.

10. The system of claim 7, wherein the second three-way valve is opened so that the coolant cooling the engine flows to the auxiliary heat exchanger when a time elapsed from when the engine is started is less than a predetermined time, and the first three-way valve is opened so that the coolant passed through the auxiliary heat exchanger flows into the main coolant line.

11. The system of claim 7, further comprising:
a temperature sensor that measures a temperature of the coolant to be introduced into the engine, wherein the first three-way valve closes the main coolant line or the bypass coolant line or adjusts the flow rate of the coolant flowing through the main coolant line and the bypass coolant line in response to the measured temperature of the coolant.

12. The system of claim 11, wherein when the temperature of the coolant falls below a lower end of a predetermined temperature range, the first three-way valve is opened so that the coolant flows toward the exhaust gas heat exchanger and closes the bypass coolant line.

13. The system of claim 11, wherein when the temperature of the coolant falls within a predetermined temperature range, the first three-way valve opens both the main coolant line and the bypass coolant line.

14. The system of claim 13, wherein the first three-way valve controls an amount of the coolant flowing along the main coolant line and the bypass coolant line in such a manner that the measured temperature of the coolant falls within the predetermined temperature range.

15. The system of claim 11, wherein when the temperature of the coolant exceeds an upper end of the predetermined temperature range, the first three-way valve closes the flow of coolant flowing toward the exhaust gas heat exchanger, and opens the bypass coolant line.

* * * * *